(12) United States Patent
Tanaka

(10) Patent No.: US 6,645,595 B2
(45) Date of Patent: Nov. 11, 2003

(54) OPTICAL MEDIUM

(75) Inventor: Mieko Tanaka, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 103 days.

(21) Appl. No.: 09/822,427

(22) Filed: Apr. 2, 2001

(65) Prior Publication Data

US 2001/0033544 A1 Oct. 25, 2001

(30) Foreign Application Priority Data

Aug. 23, 1999 (JP) ............................................. 11-235691

(51) Int. Cl.$^7$ ................................................. B32B 3/02
(52) U.S. Cl. ..................................... 428/64.1; 428/65.2
(58) Field of Search ............................. 428/64.1, 64.4, 428/65.2, 913; 430/270.11, 495.1, 945

(56) References Cited

U.S. PATENT DOCUMENTS 6,121,339 A * 9/2000 Kominami ................... 522/31
6,447,867 B1 * 9/2002 Kominami ................. 428/64.1
6,455,121 B1 * 9/2002 Ha ............................ 428/64.1
6,472,451 B2 * 10/2002 Ha ............................... 522/97

FOREIGN PATENT DOCUMENTS

| EP | 0 827 974 A1 | 3/1998 |
| EP | 1 069 074 A1 | 1/2001 |
| JP | 05 043866 | 2/1993 |
| JP | A 7-126577 | 5/1995 |
| JP | A 9-249734 | 9/1997 |
| WO | WO 00 09620 A1 | 2/2000 |

* cited by examiner

Primary Examiner—Elizabeth Mulvaney
(74) Attorney, Agent, or Firm—Oliff & Berridge, PLC

(57) ABSTRACT

An optical disk contains a recording layer and an adhesive layer between at least two substrates, wherein the adhesive layer contains a cationic polymerizable resin (A), a photo-initiator (B), and an anion catcher (C). The weight ratio of the photo-initiator (B) and the anion catcher (C) is preferably from 3:1 to 3:24, more preferably from 3:1 to 3:12.

8 Claims, 1 Drawing Sheet

OPTICAL MEDIUM

BACKGROUND OF THE INVENTION

1. Field of the Invention

The present invention relates to an optical medium such as optical recording media with which the recording of information or the playback of information recorded on an optical disk or the like can be performed.

2. Description of the Related Art

In an effort to increase recording capacity, a new type of optical disk called a bonded optical disk has been proposed in recent years, in which two disk substrates are used, each comprising a recording layer formed on a transparent resin substrate, and these two disk substrates are bonded with an adhesive layer sandwiched therebetween.

Hot-melt adhesives and radical polymerizable UV-curing adhesives, for example, have been used as the material for the adhesive layer that holds the disk substrates together in these bonded optical disks, but these could not be considered practical because of their poor heat resistance and warping of the disk substrates.

In view of this, the use of a liquid cationic polymerizable UV-curing adhesive has been proposed, as discussed in, for instance, Japanese Laid-Open Patent Application H7-126577. These cationic polymerizable UV-curing adhesives are expected to provide a huge improvement to the manufacturing process because the curing reaction proceeds upon irradiation with UV rays even in the air or in the dark, and because of the less shrinkage during the reaction, other benefits are less warping of the disk substrates and sufficient adhesive strength after curing.

Thereupon, the applicant proposed adding a so-called ion catcher (or ion exchanger) to a resin composition in an effort to prevent corrosion of the recording layer in high temperature and humidity environments when one of these cationic polymerizable UV-curing adhesives is used (Japanese Patent Application H8-59555).

This addition of an ion catcher allows ionic substances in the adhesive layer to be trapped, so the effect is better corrosion resistance.

However, because of the high light-proof property of the ion catcher, the UV rays cannot pass sufficiently into the interior of a UV-curing resin if the ion catcher is added in too large an amount, so the reaction efficiency is poor in the curing of the adhesive agent.

SUMMARY OF THE INVENTION

In order to solve the above problems, the present invention provides an optical medium with better corrosion resistance, which is accomplished by using an adhesive agent that has no detrimental effect on the recording layer in an optical medium.

The optical medium of the present invention has a recording layer and an adhesive layer between at least two substrates, wherein the adhesive layer contains (A) a cationic polymerizable resin, (B) a photo-initiator, and (C) an anion catcher.

In another aspect of the present invention, the weight ratio of the photo-initiator (B) and the anion catcher (C) in the above-mentioned optical medium is from 3:1 to 3:24.

In another aspect of the present invention, the weight ratio of the photo-initiator (B) and the anion catcher (C) in the above-mentioned optical medium is from 3:1 to 3:12.

With the above structure of the present invention, because the adhesive layer contains a cationic polymerizable resin (A) and a photo-initiator (B), the curing reaction proceeds upon irradiation with UV rays or other light, and there is also less shrinkage during the reaction.

Furthermore, because the anion catcher (C) is contained, chlorine ions and other ions contained in the resin can be removed more effectively, and this suppresses the corrosion of a reflective layer or recording layer by these ions.

Corrosion of a reflective layer or recording layer of the optical medium by ions can be suppressed particularly well when the weight ratio of the photo-initiator (B) and the anion catcher (C) is from 3:1 to 3:24.

Moreover, if the weight ratio of the photo-initiator (B) and the anion catcher (C) is from 3:1 to 3:12, an adhesive layer with good reactivity will be obtained, so this optical medium can be produced more efficiently in the manufacturing process.

DESCRIPTION OF THE PREFERRED EMBODIMENTS

Figure 1:
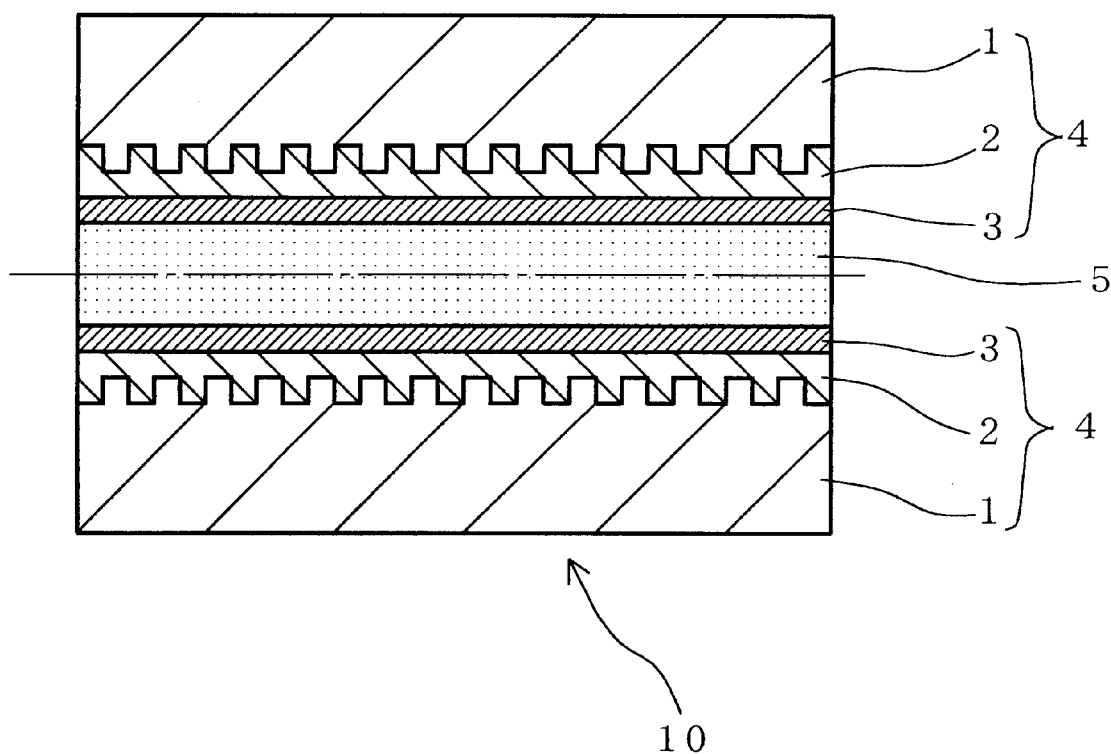
FIG. 1 is a simplified structural diagram (cross section) of the optical disk in an embodiment of the present invention.

First, before describing specific embodiments of the present invention, an overall summary of the present invention will be given.

The present invention is an optical medium having a recording layer and an adhesive layer between at least two substrates, wherein the adhesive layer contains (A) a cationic polymerizable resin, (B) a photo-initiator, and (C) an anion catcher.

Specifically, an anion catcher is used as an ion catcher (such as ion exchanger) to form the adhesive layer.

Since this effectively traps the free anions in the adhesive agent, the corrosion of the recording layer or reflective layer that would otherwise be caused by these ions can be suppressed.

Next, specific embodiments of the present invention will be described.

FIG. 1 is a simplified structural diagram (cross section) of the optical disk in an embodiment of the present invention.

As shown in FIG. 1, this optical disk 10 is called a bonded type of optical disk, which is produced by: first preparing two disk substrates 4 which are obtained by forming on one side of each of two transparent plastic substrates 1 a recording layer (reflective layer) 2 composed of e.g., an aluminum layer, in which pits representing information have been formed, to thereby create two disks with a thickness of 0.6 mm, and forming over the recording layer of each of the disks a protective layer 3 in a thickness of 5 to 10 $\mu$m; and second allowing the two disk substrates 4 to be set facing each other so that the two recording layers (reflective layers) 2 may be located on the inside; and third bonding these disk substrates with an adhesive layer 5 sandwiched therebetween.

The adhesive layer 5 comprises a resin composition containing the above-mentioned (A) a cationic polymerizable resin, (B) a photo-initiator, and (C) an anion catcher.

The cationic polymerizable resin (A) can be any known cationic polymerizable resin, such as various types of epoxy resin, vinyl ethers, cyclic ethers, acrylic resins, and other such resins that undergo cationic polymerization.

The photo-initiator (B) is a cationic polymerizable catalyst that generates a so-called Lewis acid when irradiated with UV rays or the like, and any known type can be used with no particular restrictions imposed. Examples include aromatic diazonium salts, aromatic sulfonium salts, aromatic iodonium salts, and aromatic selenium salts.

These photo-initiators are also available as commercial products. For instance, aromatic sulfonium salts include SP-150 (Asahi Denka), aromatic diazonium salts include PP-30 (Asahi Denka), and aromatic iodonium salts include Rhodorsil Photo-initiator 2074 (Rhone-Poulenc).

The anion catcher (C) such as anion exchangers can be any known type that includes bismuth, zinc, or the like in its composition, and is commercially available. Examples include IXE-530, 550, and 800 (Toa Gosei).

The amount in which this anion catcher (C) is contained in the resin composition will vary with the type of photo-initiator (B), but as discussed below, a favorable range is a weight ration of 3:1 to 3:24 with respect to the photo-initiator (B). If the weight ratio is less than 3:1, the amount of trapped ions of the adhesive layer 5 will be decreased. If the weight ratio is over 3:24, there will be a drop in the transmittance of UV rays, and these UV rays will not make it sufficiently to the lower parts, so the adhesive layer 5 will not cure well.

When a cationic polymerization system is used, it is particularly favorable for the anion catcher to have a pH of less than 7.0 (acidic). If the pH is 7 or higher, the curing of the cationic polymerization may be hindered, depending on the amount in which the anion catcher is added.

If needed, a filler or other additives may also be added to the resin composition.

A resin composition of the targeted adhesive can be obtained by uniformly mixing the various components of the resin composition as above in a triple roll mill or other such disperser.

The use of this resin composition as the adhesive layer 5 on the bonding side of the disk substrate 4 makes it possible to produce a good-quality optical disk 10 with no distortion or warping, and with less corrosion of the recording layer and reflective layer.

The thickness d of the adhesive layer 5 is preferably 5 to 500 μm. The adhesive layer should be formed on the bonding side of the disk substrate 4 so as to achieve the thickness when the substrates are bonded. If the thickness d is less than 5 μm, sufficient adhesive strength cannot be ensured when the substrates are bonded. If the thickness d is greater than 500 μm, the hiding power of the ion catcher will keep the curing from extending throughout the entire thickness.

In this embodiment, in the manufacture of the optical disk 10, the adhesive layer 5 is generally applied by so-called spin coating, in which the resin composition is supplied from a dispenser or the like onto the bonding side, after which the disk substrate 4 is rotated so as to obtain a uniform thickness, or by screen printing or another such method, but the adhesive layer 5 can also be formed by other methods.

The adhesive layer 5 may be formed on just one of the disk substrates 4, or it may be formed on both of the disk substrates 4 to be bonded.

After the adhesive layer 5 has been formed on the bonding side, it is irradiated with e.g., UV rays to initiate a cationic polymerization reaction in the adhesive layer 5. When UV rays are used, the irradiation amount thereof should be preferably 5 to 1000 mJ/cm$^2$.

After this irradiation, the disk substrates 4 are bonded and pressed so that the recording layers 2 may be located on the inside, after which the curing reaction is concluded to obtain the targeted optical disk 10.

EXAMPLES

Next, the properties and advantages of the optical medium of the present invention will be described through specific examples thereof.

Example 1

(i) Base resin composition

The various components listed below were mixed to prepare a base resin composition.

| | |
|---|---|
| (A) Epoxy resin (as the cationic polymerizable resin; Epikote 828, made by Yuka Shell Epoxy) | 100 wt. parts |
| (B) Photo-initiator (SP-150 made by Asahi Denka Kogyo) | 3 weight parts |
| (D) Filler (Aerosil #200, made by Nippon Aerosil) | 1 wt. part |

(ii) Preparation of adhesive composition

The following was added to 100 weight parts of the above-mentioned base resin composition.

| | |
|---|---|
| (C) Anion catcher (IXE-530, made by Toagosei) | 1 wt. part |

The above components were then melted and dispersed with a triple roll mill to obtain the targeted adhesive composition.

(iii) Production of optical disk

Using the adhesive composition produced as above, adhesive layers 5 were formed by screen printing on the bonding sides of two disk substrates 4. These were then irradiated with UV rays, after which the bonding sides were bonded to obtain an optical disk 10 structured as shown in FIG. 1.

Examples 2 to 5

Adhesive compositions were formed by the same method as in Example 1, but in which the added amount of the anion catcher (C) was changed to 2 weight parts, 12 weight parts, 18 weight parts, and 24 weight parts, respectively. Optical disks 10 were produced using these adhesive compositions, corresponding to Examples 2 to 5.

Comparative Example 1

An adhesive composition was formed by the same method as in Examples 1 to 5, but using 2 weight parts of an amphoteric ion catcher (C') (IXE-600, made by Toa Gosei) instead of the anion catcher. This adhesive composition was used to produce an optical disk 10.

Comparative Example 2

An adhesive composition was formed by the same method as in Examples 1 to 5, but using 2 weight parts of a cation catcher (C') (IXE-300, made by Toa Gosei) instead of the anion catcher. This adhesive composition was used to produce an optical disk 10.

Comparative Example 3

An adhesive composition was formed by the same method as in Examples 1 to 5, except that no anion catcher was added. This adhesive composition was used to produce an optical disk 10.

(iv) Evaluation methods

The optical disks 10 of Examples 1 to 5 and Comparative Examples 1 to 3 produced as above were evaluated for the following tests (a) and (b). The evaluation results are given in Table 1.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Epoxy resin (parts) | 100 | 100 | 100 | 100 | 100 | 100 | 100 | 100 |
| IC type | anion | anion | anion | anion | anion | ampho-teric | cation | none |
| IC composition | Bi | Bi | Bi | Bi | Bi | Bi | Bi | Bi |
| IC trade name | IXE530 | IXE530 | IXE530 | IXE530 | IXE530 | IXE600 | IXE300 | — |
| Pinhole count | 3 | 0 | 0 | 0 | 0 | ∞ | ∞ | ∞ |
| IC content (parts) | 1 | 2 | 12 | 18 | 24 | 2 | 2 | — |
| Initiator content (parts) | 3 | 3 | 3 | 3 | 3 | 3 | 3 | 3 |
| IC amount/initiator amount | 0.33 | 0.67 | 4 | 6 | 8 | 0.67 | 0.67 | — |
| Reactivity | AA | AA | AA | B | C | — | — | AA |

(a) Corrosion test (number of pinholes)

The bonded optical disks 10 produced as above were stored in a super-accelerated tester at a temperature of 85° C. and a humidity of 95%. The pinholes that occurred over the entire surface of the recording layer 2 of the optical disk 10 were counted after 200 hours. The infinity signs in Table 1 indicate that countless pinholes occurred over the entire surface of the disk.

(b) Reactivity test

A glass substrate was coated with the adhesive composition in a thickness of 20 μm, after which the coating was irradiated with UV rays from a 120 W metal halide lamp, and the curing state was examined after 24 hours and 7 days.

In Table 1, an "AA" indicates complete curing all the way inside after 24 hours, an "A" indicates complete curing all the way inside after 7 days, a "B" indicates that there was very slight tackiness remaining after 7 days, and a "C" indicates that only the surface layer had cured after 7 days.

It can be seen from Table 1 that when just an anion catcher was used, corrosion was remarkably reduced, and the number of pinholes was also greatly reduced.

It can also be seen that pinholes can be sufficiently suppressed by adding at least 1 weight part anion catcher per 3 weight parts photo-initiator.

In particular, it can be seen that reactivity is better and the reaction takes less time when the anion catcher is added in an amount of no more than 12 weight parts per 3 weight parts photo-initiator.

Comparative Example 1 is an example of using an amphoteric ion catcher, while Comparative Example 2 is an example of using a cation catcher. In these cases, numerous pinholes occur and corrosion resistance is inadequate.

Specifically, when these ion catchers were used, corrosion resistance was inadequate when the added amount was 2 weight parts per 3 weight parts photo-initiator, so the added amount had to be increased considerably. Increasing the added amount, however, lowers the transmittance of UV rays and slows curing.

Comparative Example 3 is an example of not using any ion catcher at all. Here again, numerous pinholes occurred because of the lack of an ion catcher.

In addition to the ion catchers listed in Table 1, evaluation tests were also conducted using IXE550 and IXE800 as anion catchers, IXE 1320 as an amphoteric ion catcher, and IXE100, IXE150, and IXE400 (all made by Toa Gosei) as cation catchers, but the same results as in Table 1 were obtained.

The above results indicates that an optical disk 10 of good quality, that undergoes very little corrosion even under environments of high temperature and humidity, can be obtained by forming the optical disk 10 using the above-mentioned resin composition for the adhesive layer 5.

Furthermore, corrosion resistance can be improved even more effectively if the cationic polymerizable resin (A) has a low content of free chlorine, or put another way, has high purity.

With the above embodiments, ions can be efficiently trapped and corrosion reduced even under environments of high temperature and humidity by using an anion catcher, which means that adequate corrosion resistance can be obtained even if the amount in which the ion catcher is added is reduced to about a tenth of the conventional amount.

Also, because the ion catcher, which is opaque, does not need to be added in as large an amount, there is an increase in the transmittance of light in the UV and visible light bands.

Furthermore, since reaction efficiency is better than in the past, a smaller dosage of UV radiation is needed, which boosts productivity.

With the above embodiments, the optical disk 10 comprised pitted recording layers 2 formed on two disk substrates 4, but the present invention can also be applied to optical disks of other structures.

For instance, it can be similarly applied in the case of a dummy substrate with no recording layer on one of the disk substrates 4, or to optical disks and opto-magnetic disks that record information through phase changes in the material or changes in magnetization, without any pits being made in the recording layer 2.

As long as a plurality of substrates are bonded with adhesive layers, the present invention can also be applied to optical media in forms other than a disk, such as those in the form of a card.

The present invention is not limited to the embodiments given above, and can take on various other aspects without deviating from the scope of the present invention.

With the present invention as discussed above, sufficient corrosion resistance can be obtained even if the added amount of ion catcher is greatly reduced as compared to the past. Therefore, an optical medium of good quality can be formed.

Also, since the ion catcher will still be effective even when added in a smaller amount, the added amount can be reduced so as to improve the transmittance of light in the UV and visible light bands.

Furthermore, since reaction efficiency is better than in the past, a smaller dosage of UV radiation is needed, which boosts productivity.

Also, the adhesive layer can be cured even if made thicker than in the past.

What is claimed is:

1. An optical medium having a recording layer and an adhesive layer between at least two substrates, wherein the adhesive layer contains (A) a cationic polymerizable resin, (B) a photo-initiator, and (C) an anion exchanger.

2. The optical medium according to claim 1, wherein the weight ratio of the photo-initiator (B) and the anion exchanger (C) is from 3:1 to 3:24.

3. The optical medium according to claim 1, wherein the weight ratio of the photo-initiator (B) and the anion exchanger (C) is from 3:1 to 3:12.

4. The optical medium according to claim 1, wherein the anion exchanger has a pH of less than 7.0.

5. The optical medium according to claim 1, further having a protective layer between the recording layer and the adhesive layer.

6. The optical medium according to claim 1, wherein the weight ratio of the photo-initiator (B) and the anion exchanger (C) is from 3:1 to less than 3:6.

7. The optical medium according to claim 1, wherein the weight ratio of the photo-initiator (B) and the anion exchanger (C) is from 3:1 to 3:5.

8. The optical medium according to claim 1, wherein the weight ratio of the photo-initiator (B) and the anion exchanger (C) is from 3:1 to 3:2.

* * * * *